E. C. HANSON AND W. L. CARLSON.
APPARATUS FOR DETECTING MINUTE VALUES OF ENERGY.
APPLICATION FILED MAY 28, 1920.
1,437,240.
Patented Nov. 28, 1922.
2 SHEETS—SHEET 1.
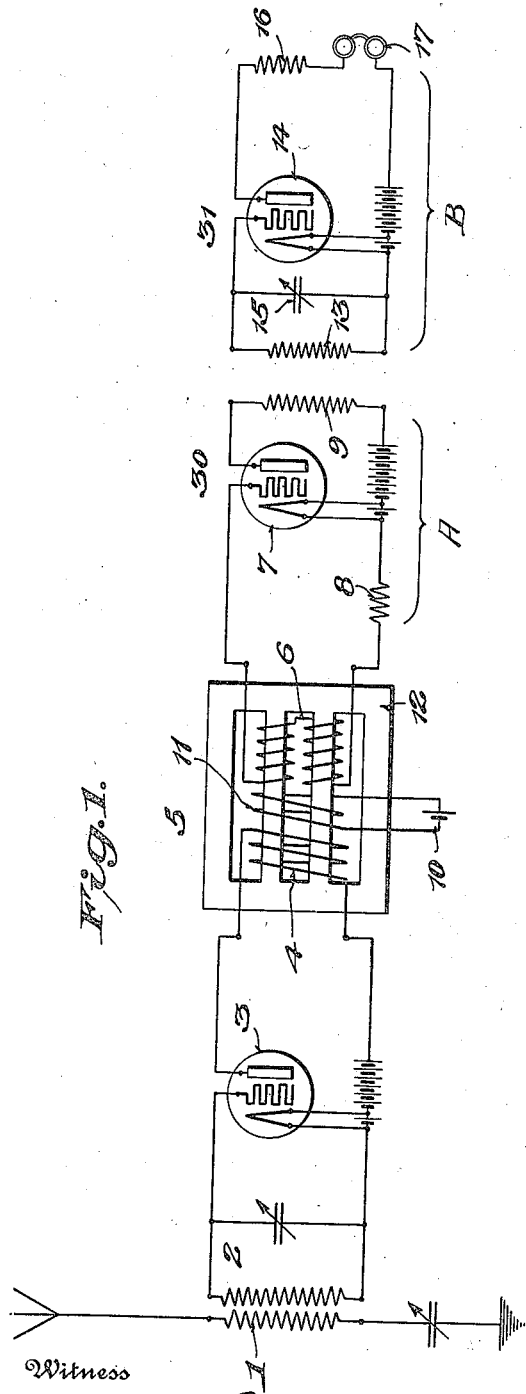
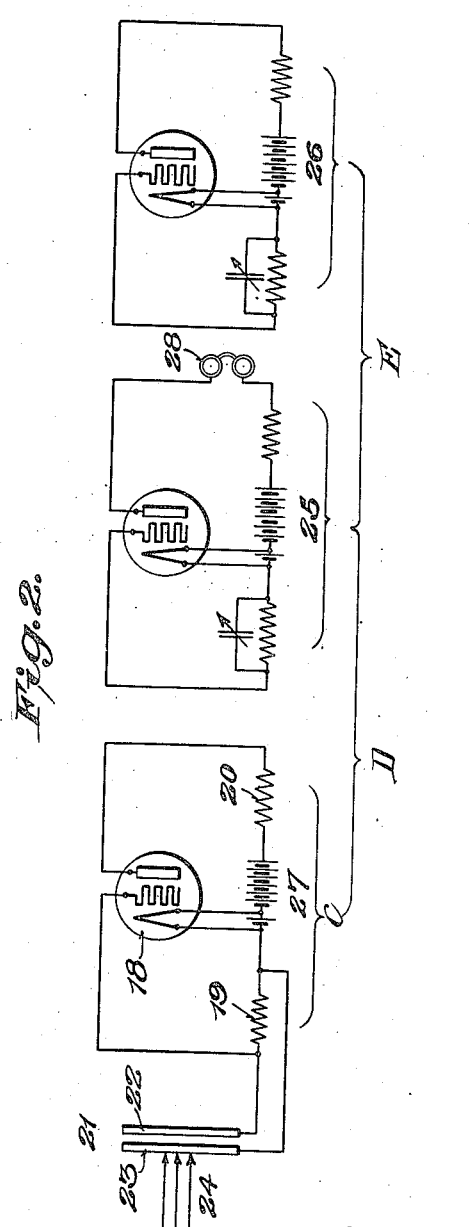
Witness
Chas. L. Griesbauer.
J. B. Brady.
Inventors
Wendell L. Carlson.
Earl C. Hanson.

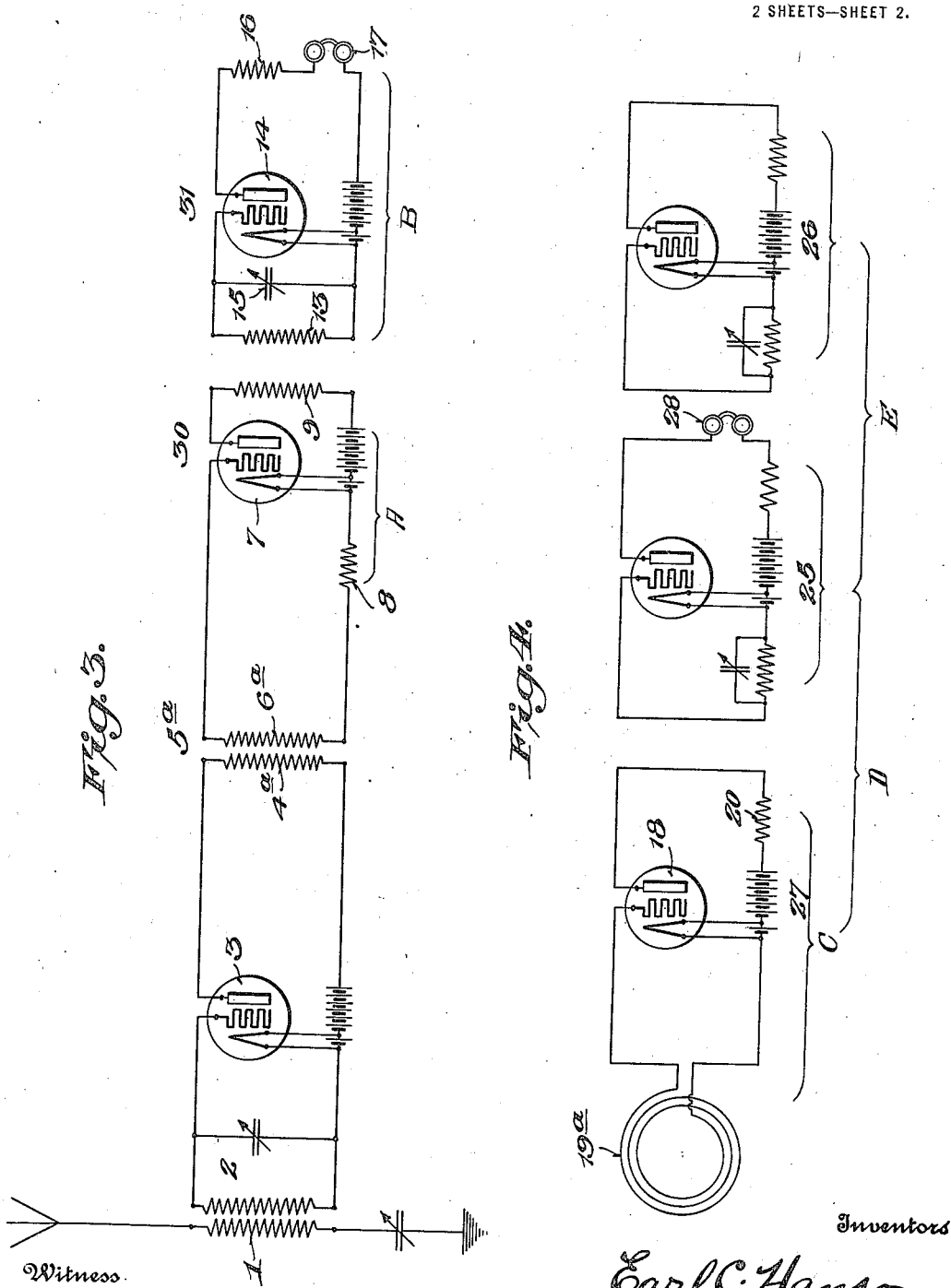

Patented Nov. 28, 1922.

1,437,240

UNITED STATES PATENT OFFICE.

EARL C. HANSON AND WENDELL L. CARLSON, OF WASHINGTON, DISTRICT OF COLUMBIA.

APPARATUS FOR DETECTING MINUTE VALUES OF ENERGY.

Application filed May 28, 1920. Serial No. 384,913.

*To all whom it may concern:*

Be it known that we, EARL C. HANSON and WENDELL L. CARLSON, citizens of the United States, residing at Washington, in the District of Columbia, have invented certain new and useful Improvements in Apparatus for Detecting Minute Values of Energy, of which the following is a specification.

The present invention relates to improved apparatus for detecting minute values of energy.

The object of the invention is to provide suitable apparatus for detecting slight variations in the frequency of an oscillating current, said variations produced by the action of an external source of energy on the constants of the circuit producing said oscillations, or by the oscillating currents induced in said circuit, influencing the local oscillation.

The fundamental principle upon which this invention is based is the "heterodyning" of two or more oscillating electric currents to produce a beat, the frequency of which will be determined by the natural constants of the circuits and the external influence of an interference acting upon one of the circuits.

The invention is shown in the accompanying drawings in four of its forms wherein:—

Figures 1 and 3 show diagrammatically the invention utilized for the reception of radio signals.

Figure 2 shows the invention adapted for measuring the luminosity of a source of light.

Figure 4 shows the invention in a form suitable for measuring the absorption of electric energy, produced by a magnetic field.

Referring particularly to Figure 1 reference character 1 designates a tuned radio frequency antenna circuit, which is coupled magnetically to the resonant circuit 2. The thermionic vacuum tube amplifier 3 has its input connected to circuit 2 and its output connected to the input winding 4 of the well known magnetic amplifier 5. The output winding 6 of the magnetic amplifier is associated with the grid circuit of the vacuum tube 7, the plate circuit of which is coupled to the grid circuit by means of the inductances 9 and 8 as indicated by brace A, forming an oscillatory circuit. The battery 10 energizes the winding 11 to vary the permeability of the iron core 12. The inductance 13 in the grid circuit of the vacuum tube 14 is loosely coupled to the inductance 9. Variable capacity 15 shunts the inductance 13. The inductance 16 and the signal responsive device 17, here shown as telephone receivers, are connected in the plate circuit of the vacuum tube 14. Inductance 16 is coupled magnetically to the inductance 13 as indicated by brace B. The necessary plate and filament batteries are connected in the various tube circuits as shown.

Referring to Figure 2 the vacuum tube 18 has its grid element connected through the inductance 19 to the filament and its plate element connected to the filament through inductance 20. Inductance 19 is shunted by capacity 21, comprising a rigid metallic plate 22 and a movable metallic plate 23. A source of energy, such as light waves, represented by the parallel lines 24 are impinged upon the movable plate 23. Inductances 19 and 20 are, if necessary, magnetically coupled as represented by brace C so as to sustain an oscillatory current in the vacuum tube circuit 27. The oscillating vacuum tube circuits 25 and 26 are the equivalent of circuit 27. Circuits 26 and 27 are magnetically coupled as represented by braces D and E, loosely, to the circuit 25. A suitable responsive device 28, here shown as telephone receivers, is inserted in the oscillating vacuum tube circuit 25.

Figure 3 is identical to Figure 1 except that transformer 5ª with primary and secondary windings 4ª and 6ª respectively, is substituted for the magnetic amplifier 5 in Figure 1.

In Figure 4 the exploring loop 19ª is substituted for the inductance 19 in Figure 2. The condenser 21 is eliminated. The inductance loop 19ª may consist of a number of convolutions of any desired diameter.

The operation of the systems are as follows:—In Figure 1 the antenna circuit 1 is actuated by a received radio frequency signal. The tuned secondary circuit 2 transfers the signal energy from circuit 1 to the grid of the vacuum tube 3. The resulting amplified signal energy in the plate circuit of the vacuum tube 3 actuates the control winding 4 of the magnetic amplifier 5, producing a change in the permeability of the magnetic iron core 12, the permeability of which has been previously adjusted to a critical point by the combination of the winding 11 and the battery 10. The change in permeability of the iron core in the magnetic amplifier will vary the inductance of the winding 6 and consequently alter the frequency of the current in the associated vacuum tube circuit 30. The oscillating vacuum tube circuits 30 and 31 have previously been adjusted to oscillate at, for example, frequencies of 20,000 cycles each. The variation in frequency of the oscillation in the circuit 30 will cause a "heterodyning" of said oscillation with the oscillation in circuit 31. A resulting rectified beat in the plate circuit of the vacuum tube 14 will be of a frequency equal to the difference in frequencies existing between the two oscillating circuits. This beat will usually be an audio frequency and, therefore, will actuate the telephone receivers 17. In the absence of an incoming signal no response will be noted in the telephone receivers due to the fact that both circuits are adjusted to the same frequency and, therefore, produce no beat. As the strength of received signal energy increases, the note frequency of the beat will raise.

The operation of the circuit in Figure 2 is as follows:—The frequency of the oscillating current in circuit 27 is caused to vary due to the change in capacity of the condenser 21. Only the slightest possible alteration in the relative distance between the two plates, due to the influence of light waves 24 exerting a pressure on one of the said plates, will be sufficient to cause a variation in the frequency of the oscillating current in circuit 27. The variation in frequency in circuit 27 will be detected in the oscillating circuit 25 by the responsive device 28. In order to accurately determine the exact change in frequency of current in the circuit 27, a third oscillating circuit 26 is employed so as to obtain a double beat to actuate the responsive device 28. The oscillating circuits 26 and 25 may be adjusted to frequencies of, for example, 1,000,000 cycles and 999,000 cycles, respectively, producing a beat note of 1,000 cycles. The circuit 27 may be very carefully adjusted to oscillate at a frequency of 1,000,001 cycles. If the strength of oscillation from circuits 26 and 27 acting on circuit 25 are equal, then a 1,000,000.5 cycle oscillation modulated at 1 cycle, will beat with the 999,000 cycle oscillation to produce an audio frequency note of 1,000.5 cycles modulated at a frequency of 1 cycle. A change in the pressure on the plate 23 causing a change in frequency of the associated oscillating circuit of $\frac{1}{10,000}$ of 1% (i. e., 1 cycle) will cause the modulation of the 1,000.5 cycle note to change from 1 cycle per second to 2 cycles per second, said change being detected in the responsive device 28, which may be, for example, a telephone receiver or frequency meter.

The apparatus shown in Figure 2 can also be used, for sound detection, measurement of atmospheric pressure, detecting the intensity of heat waves, measuring the expansion of various materials and the detection of feeble electromagnetic fields, by properly applying these sources of energy to the plate 23 of the condenser 21 in place of the light rays therein shown.

In Figure 3 a received radio frequency signal of 20,000 cycles will be amplified through the agency of the vacuum tube 3 and impressed on the oscillating circuit 30 through the medium of the transformer 5ª. Current in said local oscillating circuit, having been adjusted to a normal frequency of 20,500 cycles, will now shift to a frequency of 20,000 cycles under the influence of the incoming signal, due to the tendency of the two oscillating currents to lock in step. The circuit 31 is oscillating at a frequency of 20,500 cycles and will beat with the modified oscillation from circuit 30, producing a resultant audible frequency of 500 cycles.

In Figure 4 by substituting an exploring coil 19ª for the inductance 19 in Figure 2, the circuit may be employed for detecting the conductivity of material such as, metals, bakelite composition, woods and etc. The resulting change in frequency of current in circuit 27 due to the absorption of electric energy or the change in constants of the loop 19ª when it is brought in the vicinity of the said material, will cause a change in the frequency of the modulation detected in the responsive device 28 in an identical manner to the modulation change produced in Figure 2. Another use of this circuit is locating the presence of conducting mediums such as ore bodies and sunken ships.

We claim:

1. In an apparatus for detecting minute changes in frequency the combination of an electrically oscillating circuit, a plurality of circuits associated therewith each adapted to oscillate at different frequencies and means for observing the interaction of currents in said first named circuit and said plurality of circuits.

2. In an apparatus for detecting minute changes in frequency the combination of an electrically oscillating circuit, a pair of circuits associated therewith and each adapted to oscillate at different frequencies and means in one of said circuits for observing changes in frequency of said first named circuit.

3. In an apparatus for detecting minute changes of frequency the combination of an oscillating vacuum tube circuit, at least two additional oscillatory vacuum tube circuits associated therewith, each adjusted to different frequencies and means for observing the interaction of currents in said first named circuit and currents in said last named circuits.

EARL C. HANSON.
WENDELL L. CARLSON.